E. E. POST & E. W. FURBUSH.
Steam-Cooking.

No. 198,212. Patented Dec. 18, 1877.

WITNESSES
Herbert G. Briggs
John P. Crane

INVENTOR
Edward E. Post
Everett W. Furbush
Joseph H. Clark
atty

UNITED STATES PATENT OFFICE.

EDWARD E. POST, OF LEWISTON, MAINE, AND EVERETT W. FURBUSH, OF FREEDOM, NEW HAMPSHIRE.

IMPROVEMENT IN STEAM-COOKING.

Specification forming part of Letters Patent No. 198,212, dated December 18, 1877; application filed December 1, 1876.

*To all whom it may concern:*

Be it known that we, EDWARD E. POST, of Lewiston, in the county of Androscoggin and State of Maine, and EVERETT W. FURBUSH, of Freedom, in the county of Carroll and State of New Hampshire, have invented a new and useful Improvement in Steam-Cooking, which improvement is fully set forth in the following specification and accompanying drawings, in which—

Figure 1:
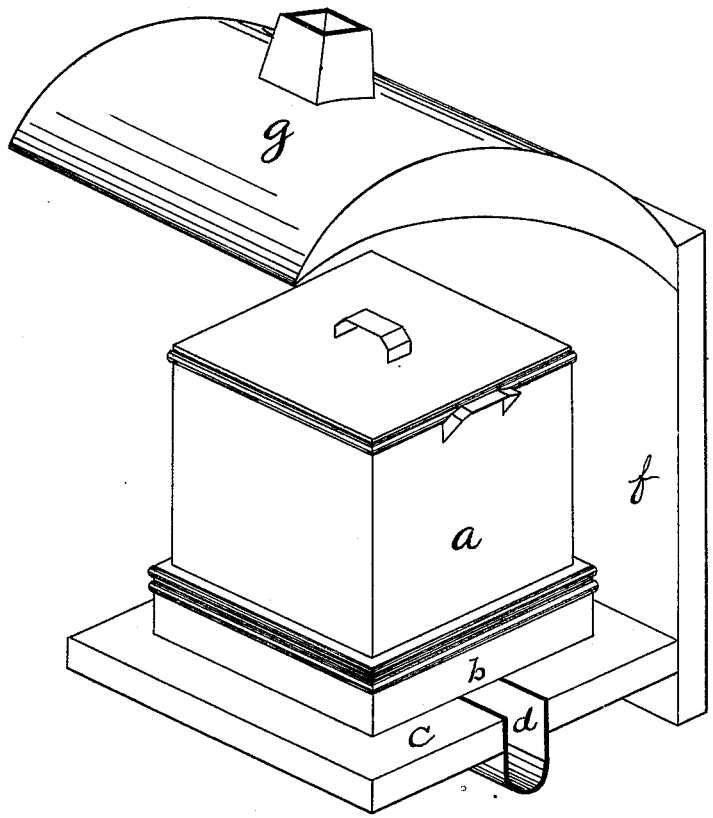
Figure 2:
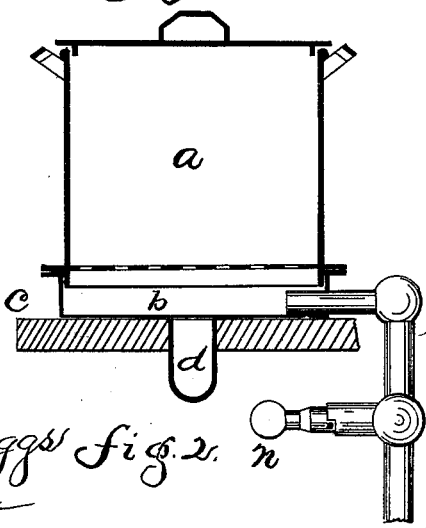

Figure 1 is a perspective view of the cooking-steamer in position for use, and Fig. 2 is a vertical section through the center of the same.

The object of our invention is to furnish a device for cooking by the steam used in heating buildings.

In the drawings, $a$ is the receptacle for holding the food while being cooked. $b$ is a steam-receiver, with a hole in the bottom to let the condensed water into the space $d$; and $c$ is a shelf, on which the steamer $a$ rests. $f$ is a wall-support, and $g$ is to help carry off the waste-steam. $e$ is the pipe to conduct the steam into the receiver $b$, which receiver should be about two inches deep, and made so that the steamer $a$ may sit in it close-fitting. $n$ is the valve to control the steam.

The steamer $a$ is made with a perforated bottom, to admit the steam used in cooking the food. Sheet-tin may be used in making the above-described articles, or any other suitable material, and the size and shape, and the number used on one shelf, may be made to suit the parties using them.

The operation of our device is seen by the foregoing, as it is obvious that when steam which is used for heating purposes is applied to food it will cook.

We are aware that steam has been used for cooking; but

What we claim as new, and desire to secure by Letters Patent, is—

The parts $a$, $b$, $c$, $d$, $e$, $f$, and $g$, in combination, all of which can be disconnected, substantially as shown and described.

EDWARD E. POST.
EVERETT W. FURBUSH.

Witnesses:
F. M. FOGG,
P. S. LAUGHTON.